United States Patent [19]

Roe

[11] 4,194,703
[45] Mar. 25, 1980

[54] TAPE MEASURE

[75] Inventor: Justus G. Roe, Sayville, N.Y.

[73] Assignee: Great Neck Saw Manufacturers, Inc., Mineola, N.Y.

[21] Appl. No.: 896,317

[22] Filed: Apr. 14, 1978

[51] Int. Cl.² .............................................. B65H 75/48
[52] U.S. Cl. .................................. 242/107.2; 33/138;
242/107.3
[58] Field of Search ............... 242/107.2, 107.3, 107.6,
242/84.8; 33/138

[56] References Cited

U.S. PATENT DOCUMENTS

| | | | |
|---|---|---|---|
| 2,222,409 | 11/1940 | Gottlieb | 242/107.3 |
| 3,482,798 | 12/1969 | Kawaguchi | 242/107.3 |
| 3,578,259 | 5/1971 | Zelnick | 242/107.2 |
| 3,889,897 | 6/1975 | Zelderen | 242/107.3 |
| 3,942,738 | 3/1976 | Rutty | 242/107.2 |

*Primary Examiner*—John M. Jillions
*Attorney, Agent, or Firm*—Holland, Armstrong, Wilkie & Previto

[57] ABSTRACT

A tape measure comprising a housing having a top wall and a front wall. A tape spool is mounted within the housing and a tape wound around said tape spool. An opening is provided in the casing to permit the tape to protrude from the housing. Spring pressed means are provided in the spool to permit the spool to rotate to automatically wind-up the tape and withdraw it into the housing. Manual brake means are provided for braking said spool to retard the winding of the tape. The tape measure has a lock slide assembly mounted for slidable movement relative to the tape with means for moving the lock slide against the tape to lock the tape in extended position and for movement away from the tape to release the tape to permit the tape to be withdrawn within the casing.

9 Claims, 9 Drawing Figures

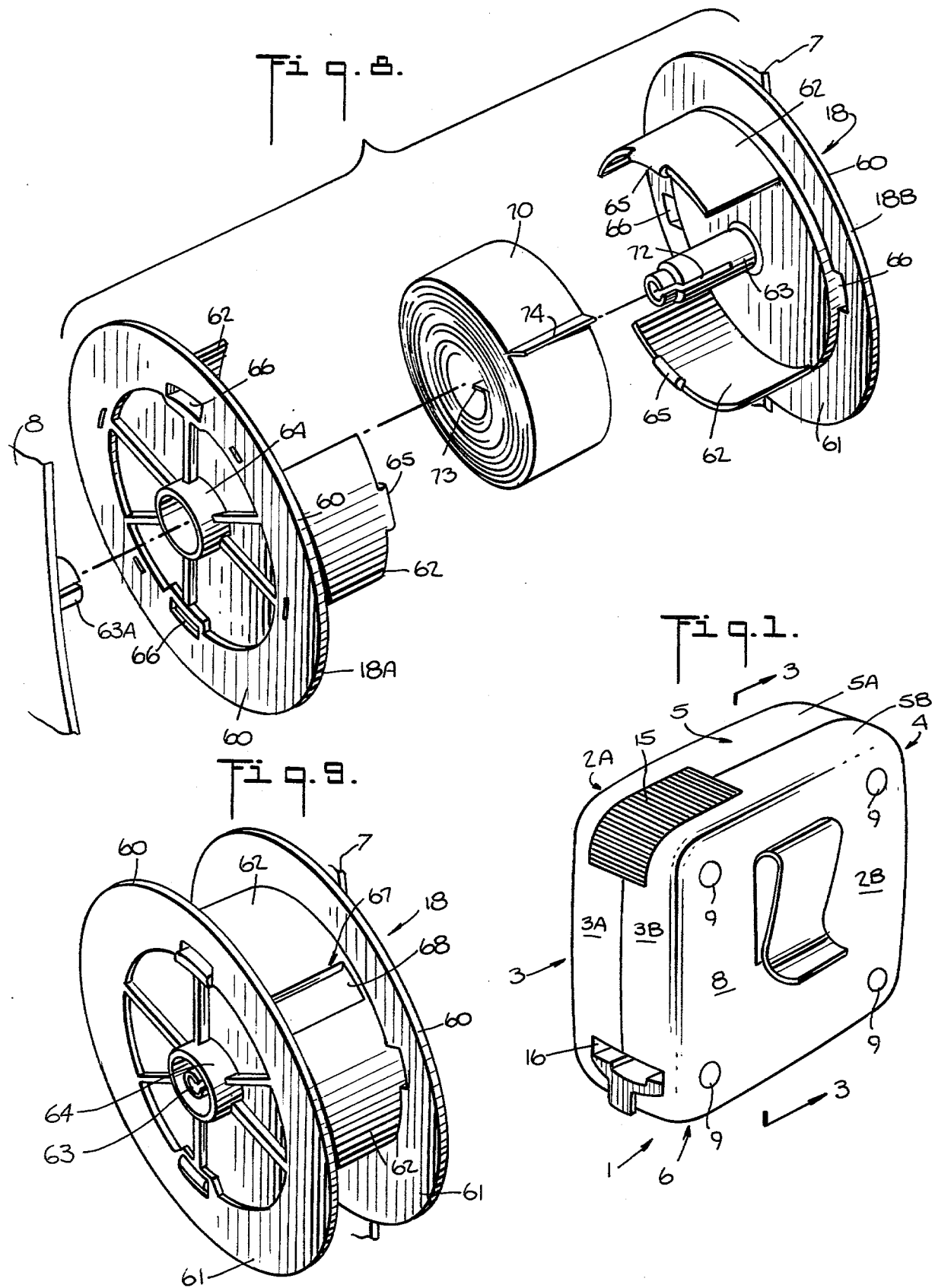

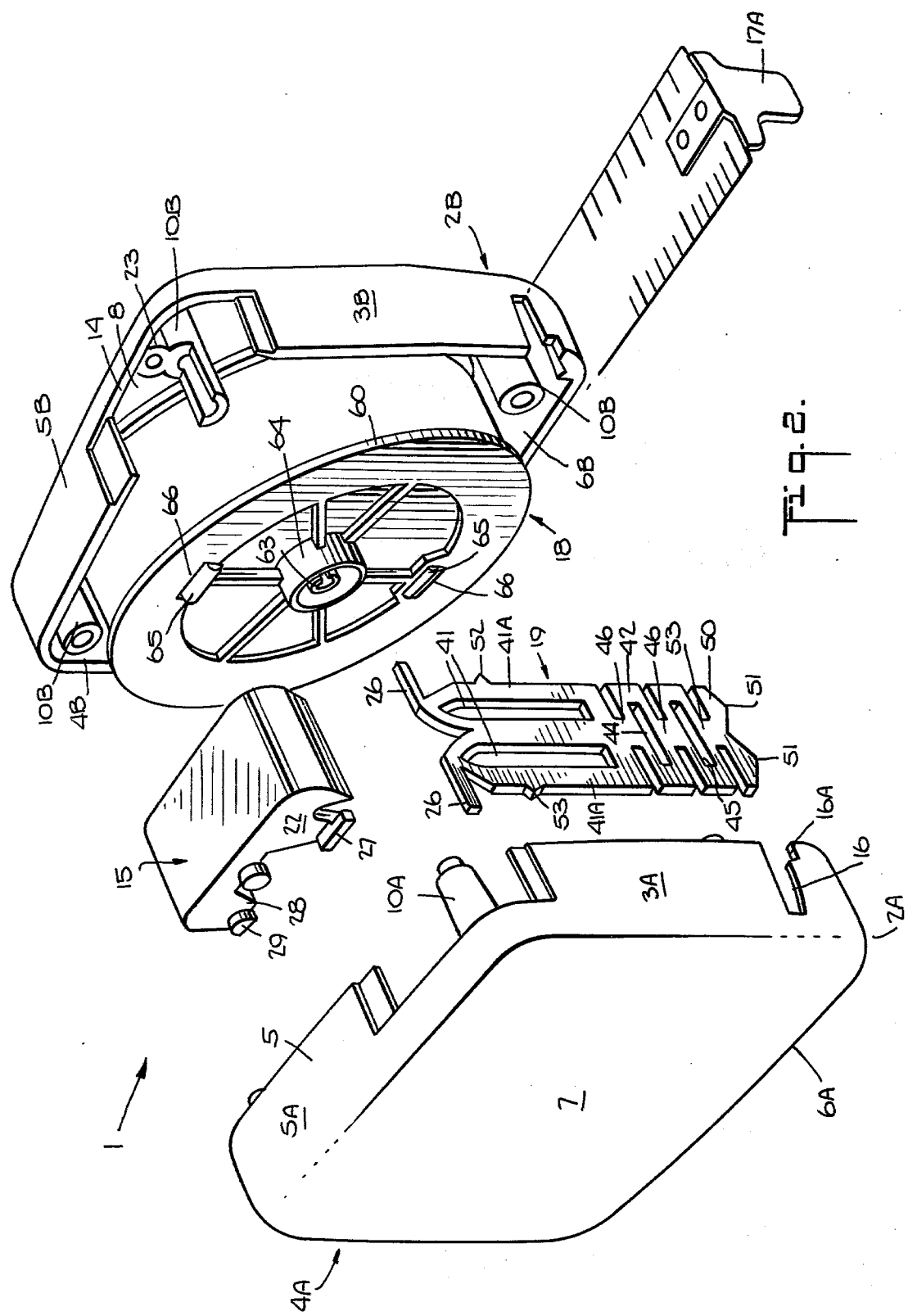

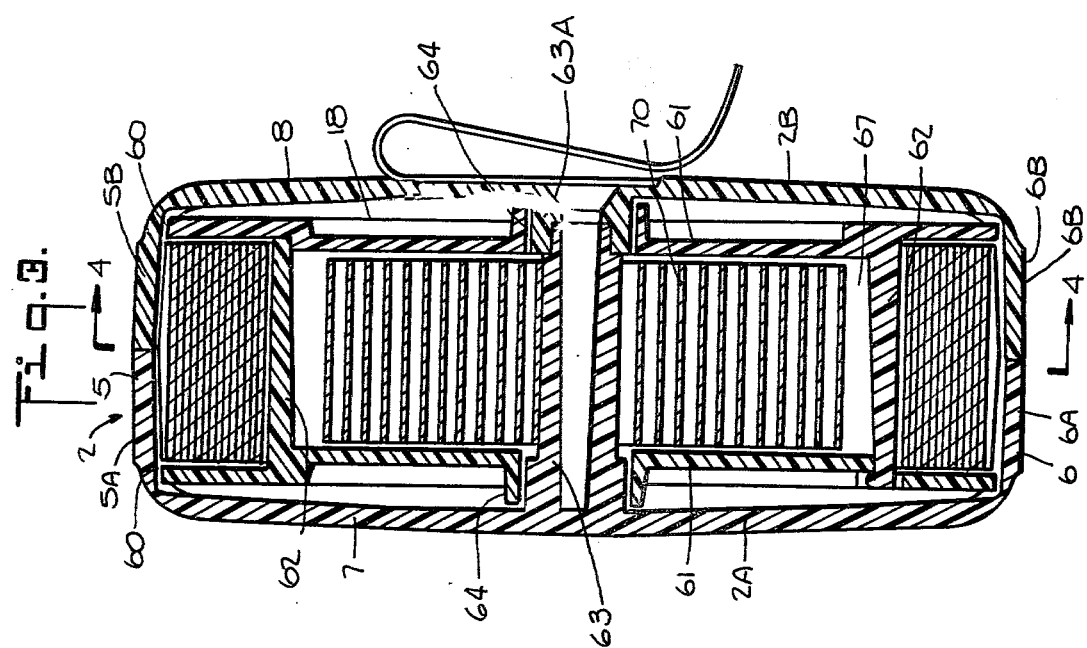
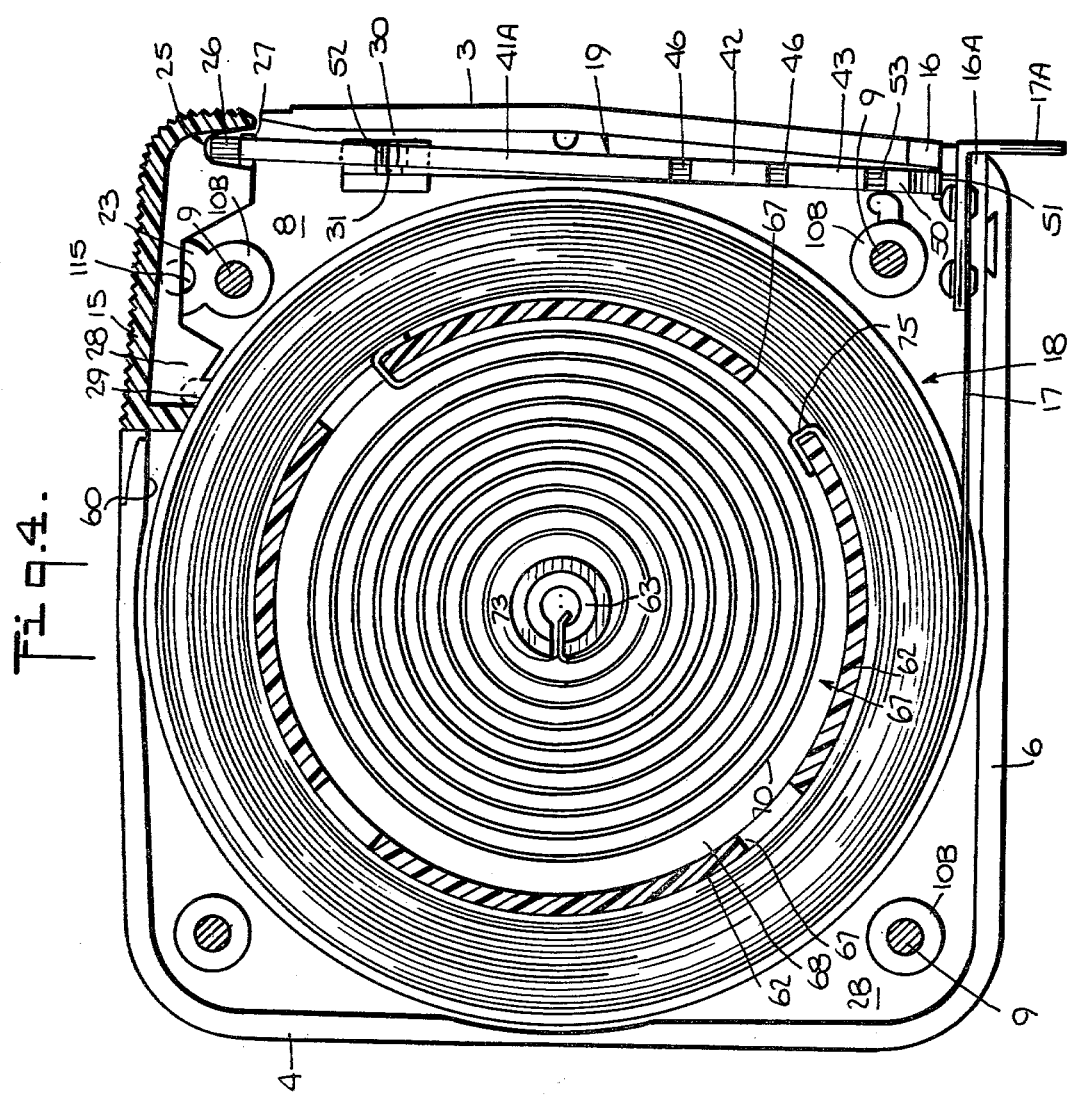

TAPE MEASURE

DESCRIPTION

The present invention is directed to an improved tape measure which is automatically recoilable.

Recoilable tape measures have been popular for a number of years. In general, they include a wound metal strip with numbers on it, which comprises the tape, and spring pressed means for maintaining the tape wound around a spool. The wound tape is in a cartridge and is adapted to be pulled out of the cartridge when it is to be used, means are provided for locking the tape in place in the extended position. When the lock is released, the tape will recoil itself and wind up automatically around the spool to be withdrawn within the cartridge.

The present invention is directed to an improved recoilable tape measure which has an improved mechanism for locking the tape in its extended position.

Another object of the present invention is the provision of an improved tape measure having means to permit braking of the tape as it is being recoiled.

Another object of the present invention is the provision of an improved tape measure which is easy to assemble and maintain.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view of the casing of the tape measure of the present invention.

FIG. 2 is an exploded view of the tape measure made in accordance with the present invention.

FIG. 3 is a sectional view taken along line 3—3 of FIG. 1.

FIG. 4 is a side sectional view taken along line 4—4 of FIG. 3 and showing the position of parts when the tape is in retracted position.

FIG. 8 is an exploded view of the spool assembly.

FIG. 9 is a perspective view of the assembled spool assembly.

Figure 6:
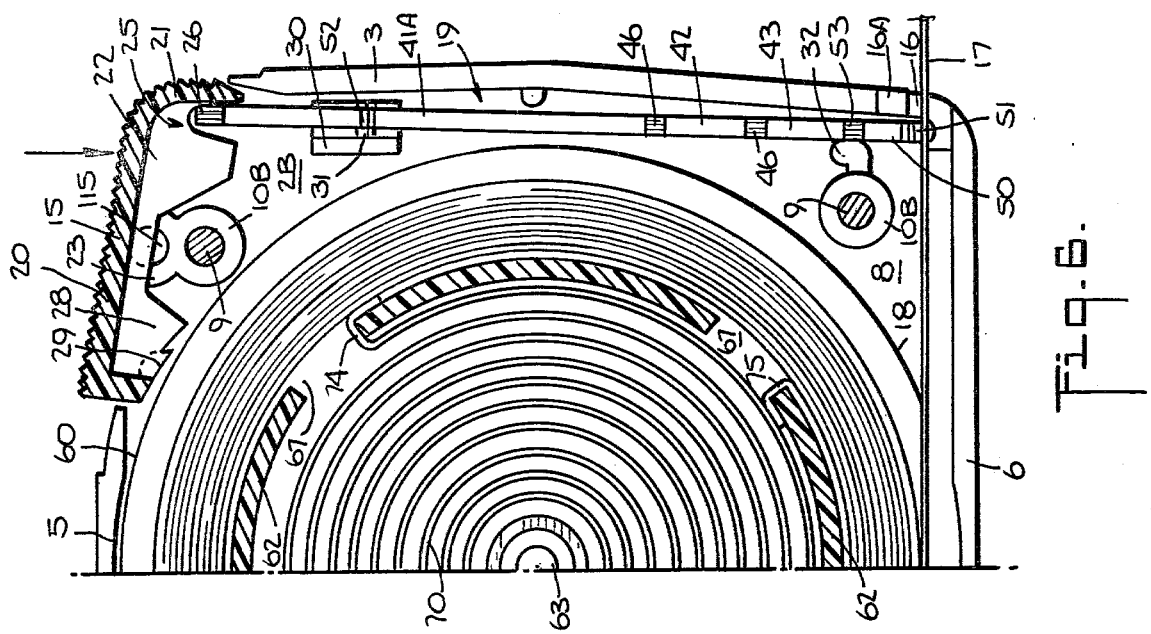
FIG. 6 is a side sectional view similar to FIG. 3 showing the position of the parts when the tape is extended.

The tape measure 1 of the present invention comprises an outer casing 2, having a front wall 3, a rear wall 4, a top wall 5, a bottom wall 6 and side walls 7 and 8. Preferably, the outer casing 2 is made of two matching half sections 2A and 2B with front, rear, top and bottom wall sections 3A-3B, 4A-4B, 5A-5B and 6A-6B, respectively. The two half sections 2A and 2B are adapted to mate with each other so that the front, rear, bottom and top walls 3, 4, 5 and 6, respectively, are completed. The half sections, 2A and 2B are held together by screws 9, or some other suitable means, mounted in guides 10A and 10B extending inwardly from the side walls 7 and 8, respectively. Spindle 63 and cooperating journal 63A extend from side walls 7 and 8, respectively.

The upper corner formed by the top wall 5 and the front wall 3 is cut-away at 14 and a push button 15 is pivotly mounted therein between side walls 7 and 8 by means of pins 115 journalled in sockets 23. A mouth 16 is formed adjacent the lower edge of the front wall 3 through which the tape 17 protrudes.

The mouth 16 is provided with a lower extension 16A to permit the tape to assume a concave position. The tape 17 is wound on a spool 18 which is rotatably mounted within the cartridge and has one end with a finger pin 17A thereon extending from the mouth 16 and a slide lock assembly 19 is slidably mounted within the cartridge adjacent the front wall 3. The slide lock is adapted to slide from a raised position to release the tape 17 to a lowered position to lock the tape 17 in place.

The push button 15 is provided with an upper wall 20, a front wall 21 and side walls 22. The push button 15 is pivotally mounted on journal 23 by means of pins 115 and is adapted to pivot for an inactive raised position (FIG. 4) to an active lowered position (FIG. 6). A notch 25 is formed in the side walls 22 adapted to accommodate upper fingers 26 of the slide lock 19, as will be described hereinafter. Along the side edges of each side wall 22 of button 15 is a retracting finger 27 which extends under fingers 26 as will also be described hereinafter. The rear end of each button side walls 25 is provided with a downwardly facing extension 28 which has brake pads or brake surfaces 29 mounted thereon. The brake pads or surfaces 29 are adapted to strike the edge of the spool 18 in order to brake the retraction of the spool 18 as well as to temporarily stop the tape at any desired particular point during retraction.

Each side wall of the cartridge is provided with a lock projection 30 extending inwardly therefrom having a notch 31 adapted to lock the slide 19 in its lowered position. The lower part of each side wall half has pads 32 extending forwardly from sleeves 10B and in contact with the slide 19 to hold the slide 19 in proper vertical alignment with respect to the front wall 3.

The slide 19 is preferably a resilient element made of a plastic material which has an upper main body portion 40 with upright openings 41 on either side thereof to form side strips 41A and to give the slide transverse resiliency. In the embodiment shown in the drawings, lower body portions 42 and 43 are provided, each with transverse openings 44 and 45, respectively, therein to give the slide 19 longitudinal flexibility. The lower portions 42 and 43 are connected to each other and to the upper body portion 40 by a necks 46. A lower pressure pad 50 having a pair of pressure points 51 depends from lower pressure body portion 43 by neck 53. The lower pressure pad 50 is adapted to strike the extended tape 17 in order to hold the tape 17 in place.

The main body portion 40 of the slide 19 is provided with a pair of outwardly extending side knobs 52 adapted to cooperate with notches 31 to hold the slide 19 in place when the slide 19 is in its lowered position. The resiliency of strips 41A caused by the openings 41 permits the pins 52 to flex over and into openings 30.

As set forth above, the upper part of the slide has a pair of outwardly extending control fingers 26. The control fingers 26 are adapted to remain seated in notches 25 in the side walls 22 of the button 15 and to lie above the retracting fingers 27 of the slide 19. Hence, when the button 15 is depressed, the button 15 will apply downward pressure to the slide 19 to move the slide 19 downwardly so that the pressure points 51 of bottom pad 50 strike the extended tape 17 to press the tape against the mouth bottom 16 to hold the tape in place. The side knobs 52 snap into the notches 31 so that the tape 17 is locked in place in the desired extended position.

When the tape is to be withdrawn, the button 15 is pivoted in the opposite direction so that the control fingers 26 lift the slide 19 through its lift fingers 27 removing the snapping knobs 52 from out of notches 31 and raising the pad projections 51 off the tape 17 to permit the tape to be withdrawn.

The tape is withdrawn by the re-winding of the spool 18. In order to avoid the spool from being wound very quickly or, if desired, to momentarily stop the tape at any desired position, rearward pressure is applied to the button 15 so that the rear brake pads 29 abut the rims 60 of the side walls of spool 18 in order to brake the winding of the spool 18.

The spool 18 of the present invention comprises two halves 18A and 18B each having side walls 61 with outer rims 60, spaced circular tape supporting segments 62 hub elements 64. The halves 18A and 18B have locking tips 65 extending therefrom and also have cooperating locking openings 66 so that when the two halves 18A and 18B are mounted together, the locking tips 65 extend through openings 66 in the side faces of the opposite halves to hold the two together. The segments 62 cover less than 180° of each half so that when the halves are mounted together, the segments form an inner hollow spring housing 67 with openings 68 therein.

A reverse wound metal spring 70 is positioned within the housing 67 with its inner end around the spindle 63 and with a catch 73 inserted into a slot 72 in spindle 63. A catch 74 at the other end of the spring extends through the opening 67 to bias the spring and the spool in the opposite direction. The tape 17 is wound around the outside of the segments 62 and has at its inner end a catch 75 hooked onto another of the segment openings 67. Hence, when the tape 17 is extended, the inner spring 70 is wound tight with the spool wound in one direction and when the tape 17 is released, the inner spring 70 will unwind and pull the tape 17 with it by rotating the spool 18 in the opposite direction.

Figure 7:
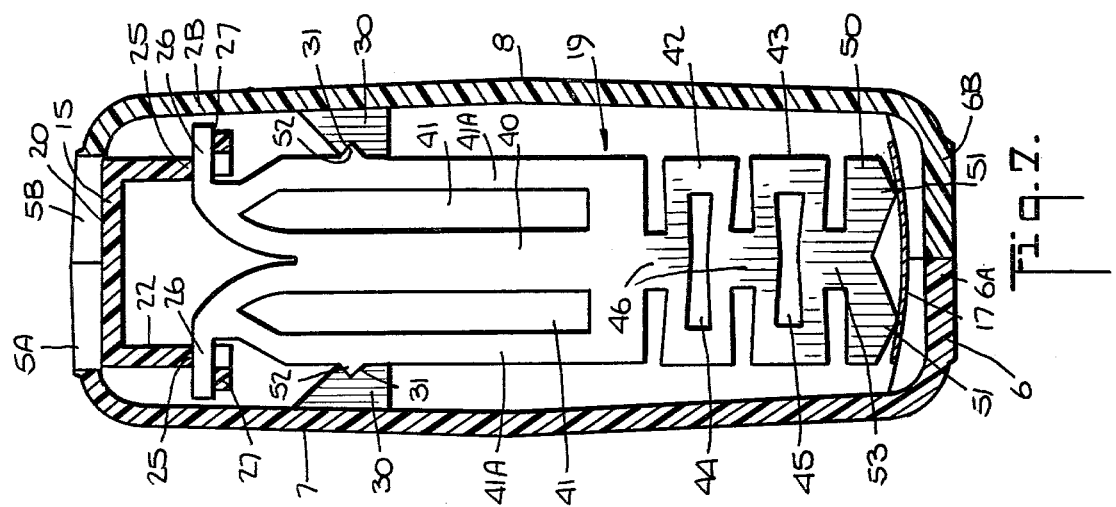
FIG. 7 is a front sectional view showing the position of the parts when the tape is extended.
Figure 5:
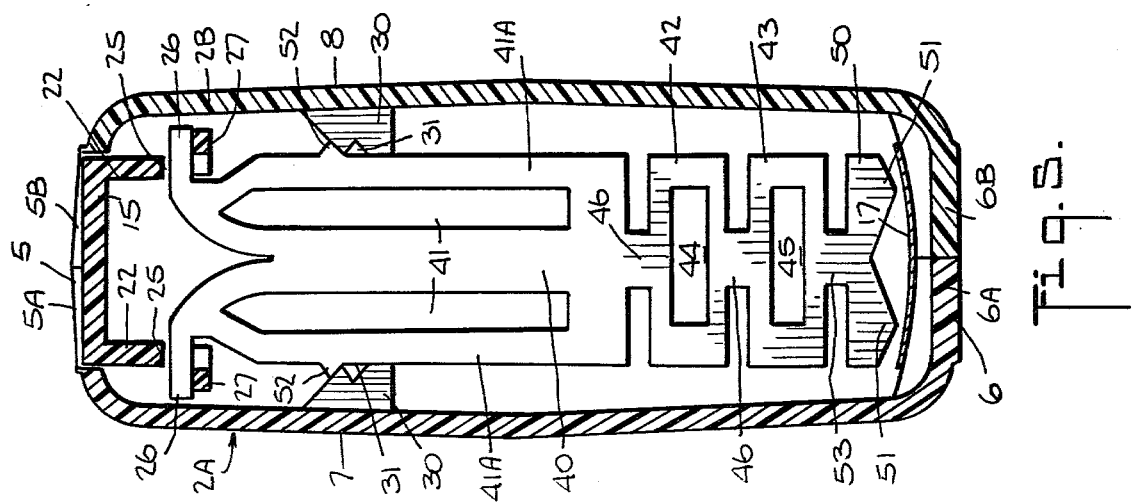
FIG. 5 is a sectional front view showing the position of the parts when the tape is in retracted position.

As will be apparent from the above, with the push button 15 and the lock slide in the raised position shown in FIGS. 4 and 5, the tape 17 is to be pulled out of the opening of the mouth 16 to wind up the spring 70. When the desired length is reached, the push button 15 is pivoted downwardly to the position shown in FIGS. 6 and 7 where the slot 25 strikes the fingers 26 of the slide 19 to push it downwardly so that the lower pads 51 strike the tape and press the tape against the lower mouth in order to hold the tape in place. At the same time, the knobs 52 flex into slots 31 to lock the slide in the lowered position. When it is desired to release the tape, the pivot fingers 15 is pivoted in the opposite direction to assume the position of FIG. 4 and the spring 70 of the spool 18, which had been wound-up, starts to unwind carrying the tape 17 with it. In order to prevent the tape from unwinding at a rapid rate or to momentarily halt the tape at a given position, pressure may be applied to the rear portion of the button 15 so that the brake pads 29 abut the rim 60 of the spool to frictionally engage the rotating spool and slow its revolution.

It will thus be seen that the present invention is directed to an improved recoilable tape measure which has a more positive mechanism for locking the tape in the extended position, which has means to permit braking of the tape measure as it is being recoiled and which is easy to assemble and maintain.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A tape measure comprising a housing having a top wall and a front wall, a tape spool within the housing, a tape wound around said tape spool, an opening in the casing to permit the tape to protrude therefrom, a tape lock mechanism adjacent the tape spool to lock said tape in said protruded position, spring pressed means in the spool to permit the spool to rotate to automatically wind-up the tape from said protruded position and withdraw it into the housing, manually operable brake means spaced from said tape lock mechanism for braking said spool to retard the winding of the tape, said brake means comprises a movable button, said button having a brake pad associated therewith to overlie the rim of the spool whereby movement of said button in one direction will cause the brake pad to strike said rim and said button connected to the tape lock mechanism so that movement in one direction will lock the tape in place and movement in the other direction will release the tape.

2. A tape measure as claimed in claim 1, wherein said button is pivotally mounted on the casing and has a rear arm extending therefrom with the brake pad mounted on said arm and has a forward arm extending therefrom, said forward arm being connected to the lock mechanism.

3. A tape measure as claimed in claim 2, wherein the forward arm of said button has a notch therein and wherein a slide having a main portion is provided which has one end mounted in said notch and its other end in position to apply pressure to the tape to lock the tape in extended position.

4. A tape measure as claimed in claim 3, wherein said slide has a control finger extending therefrom at said upper end which is mounted within said notch.

5. A tape measure as claimed in claim 4, wherein the forward arm of said button has a lift finger extending beneath said control finger to permit the slide to be lifted.

6. A tape measure as claimed in claim 5, wherein said slide comprises a lock knob extending therefrom and wherein said casing has a notch adapted to cooperate with said knob to hold the slide in its tape locking position.

7. A tape measure as claimed in claim 6, wherein said slide has an opening in the main portion thereof to give resiliency thereto.

8. A tape measure as claimed in claim 7, wherein the lower portion of the slide is provided with a pressure pad and is connected to the main portion of the slide by means of a neck.

9. A tape measure as claimed in claim 8, wherein at least one lower body portion is interposed between the lower pad and the main body, said lower body portion having an opening therein to give resiliency thereto.

* * * * *